United States Patent
Awoniyi-Oteri et al.

(10) Patent No.: US 11,375,419 B2
(45) Date of Patent: Jun. 28, 2022

(54) PRIORITIZATION OF UPLINK OR DOWNLINK TRANSMISSIONS DURING MAKE-BEFORE-BREAK (MBB) HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Hung Dinh Ly, San Diego, CA (US); Yan Zhou, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/062,403

(22) Filed: Oct. 2, 2020

(65) Prior Publication Data
US 2021/0105678 A1    Apr. 8, 2021

Related U.S. Application Data

(60) Provisional application No. 63/063,020, filed on Aug. 7, 2020, provisional application No. 62/911,153, filed on Oct. 4, 2019.

(51) Int. Cl.
*H04W 36/00* (2009.01)
*H04W 36/08* (2009.01)

(52) U.S. Cl.
CPC ... *H04W 36/0083* (2013.01); *H04W 36/0069* (2018.08); *H04W 36/08* (2013.01)

(58) Field of Classification Search
CPC ............... H04W 72/042; H04W 36/08; H04W 36/0069; H04W 36/0016; H04W 36/0077; H04W 36/0083; H04W 36/0072; H04W 36/18; H04W 36/0005; H04W 36/28; H04W 36/00837; H04W 36/0088; H04W 36/06

See application file for complete search history.

(56) References Cited

U.S. PATENT DOCUMENTS

2016/0029231 A1    1/2016 Kazmi et al.
2016/0198375 A1*   7/2016 Sundberg .............. H04W 36/18
                                                        370/280

(Continued)

OTHER PUBLICATIONS

Intel Corporation: "Scheduling/HARQ Enhancements for URLLC", 3GPP Draft, 3GPP TSG RAN WG1 Meeting#96, R1-1904308 Intel-EURLLC SCHEDHARQ, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 3, 2019 (Apr. 3, 2019), XP051707184, 9 pages, Retrieved from the Internet: URL: http://www.3gpp.org/ftp/tsg%5Fran/WG1%5FRL1/TSGR1%5F96b/Docs/R1%2D1904308%2Ezip.

(Continued)

*Primary Examiner* — Allahyar Kasraian
(74) *Attorney, Agent, or Firm* — Patterson + Sheridan, L.L.P.

(57) ABSTRACT

Certain aspects of the present disclosure provide techniques for prioritizing overlapping or near overlapping uplink and downlink transmissions for a source base station (BS) and a target BS during a make-before-break handover of a user equipment (UE) from the source BS to the target BS.

40 Claims, 8 Drawing Sheets

(56) References Cited

U.S. PATENT DOCUMENTS

| | | | |
|---|---|---|---|
| 2017/0272987 A1* | 9/2017 | Han | H04L 5/0096 |
| 2018/0102807 A1* | 4/2018 | Chen | H04L 25/03006 |
| 2020/0351729 A1* | 11/2020 | Rastegardoost | H04W 36/0072 |
| 2021/0076273 A1* | 3/2021 | Zhou | H04W 36/18 |
| 2021/0076276 A1* | 3/2021 | Awoniyi-Oteri | H04W 36/00835 |
| 2021/0076395 A1* | 3/2021 | Zhou | H04W 72/046 |
| 2021/0084546 A1* | 3/2021 | Awoniyi-Oteri | H04W 36/18 |
| 2021/0084549 A1* | 3/2021 | Nam | H04W 36/0072 |
| 2021/0345205 A1* | 11/2021 | Persson | H04W 36/023 |

OTHER PUBLICATIONS

Intel Corporation: "In-Device Coexistence Issues for EV2X Communication", 3GPP Draft, 3GPP TSG RAN WG1 Meeting #97, R1-1906798, Intel—EV2X COEX, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728249, 8 pages, Retrieved from the Internet: URL: http://www.3gpp.org/ftp/Meetings%5F3GPP%5FSYNC/RAN1/Docs/R1%2D1906798%2Ezip.

International Search Report and Written Opinion—PCT/US2020/054185—ISA/EPO—Jan. 18, 2021.

LG Electronics, et al., "Discussion on In-device Coexistence Between LTE and NR Sidelinks", 3GPP Draft, 3GPP TSG RAN WG1 #96bis, R1-1905442, Discussion on In-device Coexistence Between LTE and NR Sidelinks, 3rd Generation Partnership Project (3GPP), Mobile Competence Centre, 650, Route Des Lucioles, F-06921, Sophia-Antipolis Cedex, France, vol. RAN WG1, No. Xi'an, China; Apr. 8, 2019-Apr. 12, 2019, Apr. 3, 2019, XP051707512, 4 pages, http://www.3gpp.org/ftp/tsg%5Fran/WG1%5FRL1/TSGR1%5F96b/Docs/R1%2D1905442%2Ezip.

Qualcomm Incorporated: "Support Tx Sharing During MBB HO," 3GPP Draft, 3GPP TSG-RAN WG2 Meeting #107, R2-1908933, 3rd Generation Partnership Project (3GPP), Mobile Competence Centre, 650, Route Des Lucioles, F-06921, Sophia-Antipolis Cedex, France, vol. RAN WG2 No. Prague, CZ; Aug. 26, 2019-Aug. 30, 2019, Aug. 15, 2019, XP051766751, 4 pages, http://www.3gpp.org/ftp/tsg_ran/WG2_RL2/TSGR2_107/Docs/R2-1908933.zip.

Samsung: "Report of [105bis#16] [NR/mob enh] Interruption Time Definition", 3GPP Draft, 3GPP TSG RAN WG2 Meeting #106, R2-1907943 Report of 105BIS#16 NRMOB ENH Interruption Time Definition Summary, 3rd Generation Partnership Project (3GPP), Mobile Competence Centre, 650, Route Des Lucioles, F-06921, Sophia-Antipolis Cedex, France, vol. RAN WG2, No. Reno, USA, May 13, 2019-May 17, 2019, May 9, 2019, XP051740275, 17 pages, http://www.3gpp.org/ftp/tsg%5Fran/WG2%5FRL2/TSGR2%5F106/Docs/R2%2D1907943%2Ezip.

ZTE Corporation: "Report of [105#57] [LTE/feMOB] UE and Network side Impacts of Single/dual Protocol Stacks", 3GPP Draft, 3GPP TSG RAN WG2 Meeting #105bis, R2-1904255 Report of 105#57—Impacts of Single-Dual Active Protocol Stacks, 3rd Generation Partnership Project (3GPP), Mobile Competence Centre, 650, Route Des Lucioles, F-06921, Sophia-Antipolis Cedex, France, RAN WG2, Xi'an, China, Apr. 8, 2019-Apr. 12, 2019, Apr. 6, 2019, XP051701563, 34 pages, http://www.3gpp.org/ftp/Meetings%5F3GPP%5FSYNC/RAN2/Docs/R2%2D1904255%2Ezip.

\* cited by examiner

PRIORITIZATION OF UPLINK OR DOWNLINK TRANSMISSIONS DURING MAKE-BEFORE-BREAK (MBB) HANDOVER

CROSS-REFERENCE TO RELATED APPLICATIONS

This application claims benefit of and priority to U.S. Provisional Patent Application No. 62/911,153, filed Oct. 4, 2019 and 63/063,020, filed Aug. 7, 2020, each of which is hereby incorporated by reference in its entirety.

BACKGROUND

Field of the Disclosure

Aspects of the present disclosure relate to wireless communications, and more particularly, to techniques for prioritizing overlapping or near overlapping uplink and downlink transmissions for a source base station (BS) and a target BS during a make-before-break (MBB) handover of a user equipment (UE) from the source BS to the target BS.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for prioritizing overlapping or near overlapping uplink and downlink transmissions for a source base station (BS) and a target BS during a make-before-break (MBB) handover of a user equipment (UE) from the source BS to the target BS.

Certain aspects of the present disclosure provide a method for wireless communication by a UE. The method generally includes detecting that the UE is simultaneously connected to a source BS of a source cell and a target BS of a target cell during a handover of the UE from the source cell to the target cell; detecting during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; and in response to the detecting, communicating based on one of the first or second transmissions at the respective first or second transmission time, wherein a decision relating to communicating based on which one of the first or second transmissions is based on at least one of a rule or a priority associated with at least one of the first transmission or the second transmission.

Certain aspects of the present disclosure provide a method for wireless communication by a BS. The method generally includes detecting that a UE is simultaneously connected to a source BS of a source cell and a target BS of a target cell during a handover of the UE from the source cell to the target cell; detecting during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; determining that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission; and communicating with the UE based on the determination.

Certain aspects of the present disclosure provide an apparatus for wireless communication by a UE. The apparatus may include at least one processor and a memory configured to: detect that the UE is simultaneously connected to a source base station (BS) of a source cell and a target BS of a target cell during a handover of the UE from the source cell to the target cell; detect during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; and in response to the detection, communicate based on one of the first or second transmissions at the respective first or second transmission time, wherein a decision relating to communicating based on which one of the first or second transmissions is based on at least one of a rule or a priority associated with at least one of the first transmission or the second transmission.

Certain aspects of the present disclosure provide an apparatus for wireless communication by a network entity. The apparatus may include at least one processor and a memory configured to: detect that a user equipment (UE) is simultaneously connected to a source base station (BS) of a source cell and a target BS of a target cell during a handover of the UE from the source cell to the target cell; detect during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; determine that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission; and communicate with the UE based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
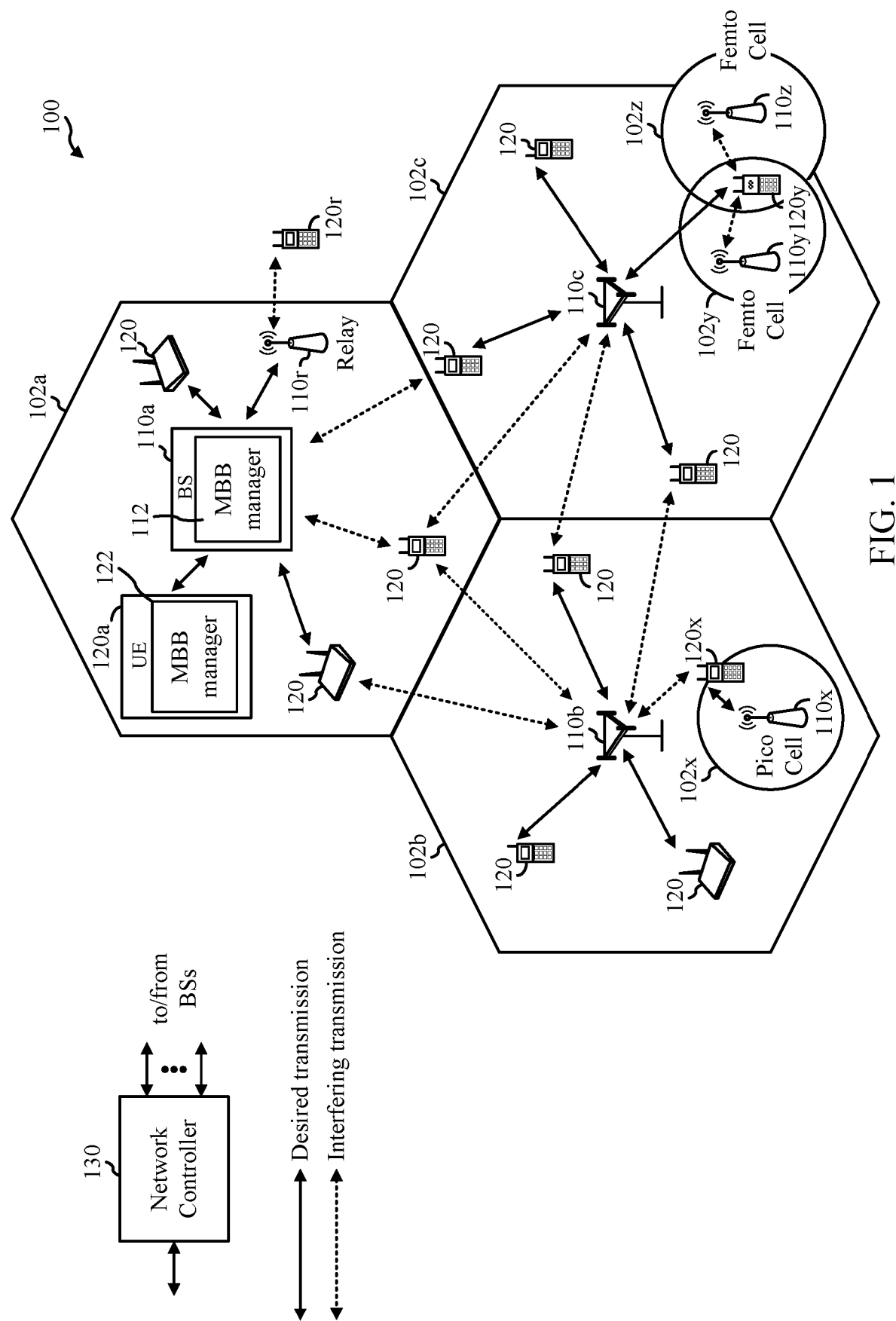
FIG. 1 is a block diagram conceptually illustrating an example telecommunications system, in accordance with certain aspects of the present disclosure.

A user equipment (UE) is configured by a network entity with a time division duplex (TDD) downlink (DL)-uplink (UL) pattern for communication with one or more base stations (BSs) (e.g., gNBs). The TDD DL-UL pattern specifies which slots are to be used for DL transmissions and which slots are to be used for UL transmissions. A TDD DL-UL pattern may designate each slot as a DL slot (D), an UL slot (U) or a special slot (S). A slot designated as D is to be used for DL transmission to the UE, a slot designated as U is to be used for UL transmission by the UE, and a slot designated as a special slot S may be used for UL or DL transmissions.

In certain cases, during a make-before-break (MBB) handover of a UE from a source cell to a target cell, the source and the target gNBs of the respective cells may not coordinate the assignment of resources (e.g., time and frequency resources) for communication with devices (e.g., UEs) in the respective source and target cells. For example, the source and target cells may not coordinate the assignment of DL-UL patterns for communication with the UE. This lack of coordination between the source and target gNBs may lead to the source and target gNBs configuring overlapping UL and DL resources for communication with the same UE during the MBB handover. For example, both the source and target gNBs may configure a same slot or portion of a same slot for communication in opposite directions with the UE. For example, the particular slot may be configured as a DL slot by the source gNB and the same slot may be configured as an UL slot by the target gNB, or vice versa.

Most UEs generally are unable to communicate simultaneously on UL and DL direction. Thus, when the source and target cells have overlapping resources or near overlapping resources (e.g., time difference of assignments less than the minimum threshold time) scheduled for communication in opposite directions (e.g., UL for first cell and DL for second cell, and vice versa), the UE cannot simultaneously transmit in the UL direction to one cell and receive in the DL direction from the other cell.

Aspects of the present disclosure provide techniques for selecting between an UL transmission and a DL transmission scheduled by source and target cells on at least partially overlapping resources or when a time interval (D) between resource assignments of the source and target cells is less than a minimum required threshold time, when a UE is expected to communicate simultaneously with the source and target cells during a MBB handover of the UE between the source and target cells.

The following description provides examples of prioritizing overlapping or near overlapping UL transmissions for a source (BS and a target BS during a MBB handover of a UE from the source BS to the target BS in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may include one or more UEs 120$a$ (with a MBB manager 122) configured to perform operations 500 of FIG. 5 and/or one or more BSs 110$a$ (with a MBB manager 112) configured to perform operations 600 of FIG. 6.

The wireless communication network 100 may include a number of BSs 110$a$-$z$ (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BSs for the femto cells 102$y$ and 102$z$, respectively. ABS may support one or multiple cells. The BSs 110 communicate with user equipment (UEs) 120$a$-$y$ (each also individually referred to herein as UE 120 or collectively as UEs 120) in the wireless communication network 100. The UEs 120 (e.g., 120$x$, 120$y$, etc.) may be dispersed throughout the wireless communication network 100, and each UE 120 may be stationary or mobile.

The wireless communication network 100 may also include relay stations (e.g., relay station 110$r$), also referred to as relays or the like, that receive a transmission of data and/or other information from an upstream station (e.g., a BS 110$a$ or a UE 120$r$) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
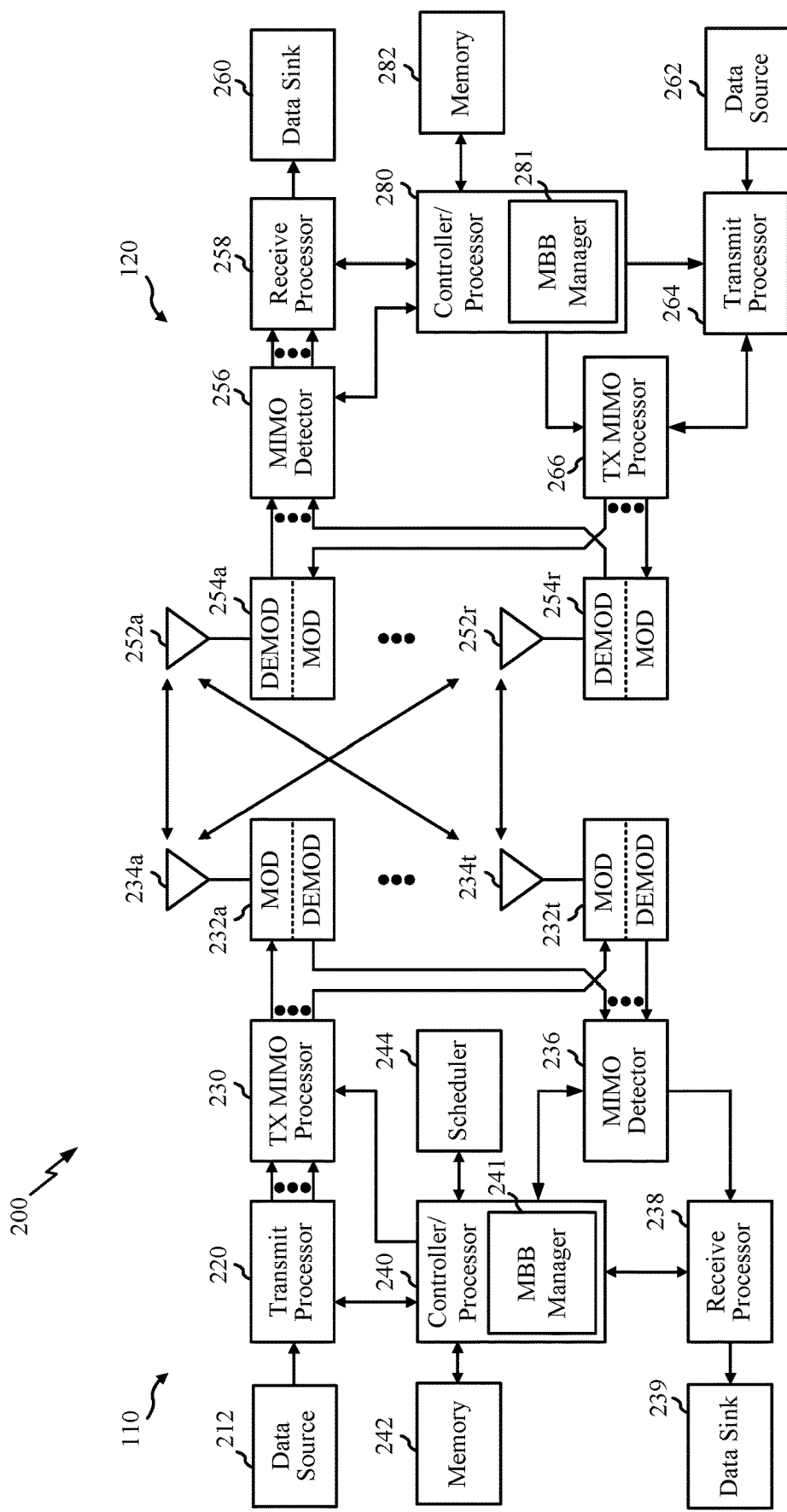
FIG. 2 is a block diagram conceptually illustrating a design of an example a base station (BS) and user equipment (UE), in accordance with certain aspects of the present disclosure.

FIG. 2 illustrates example components of BS 110$a$ and UE 120$a$ (e.g., in the wireless communication network 100 of FIG. 1), which may be used to implement aspects of the present disclosure.

At the BS 110$a$, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232$a$-232$t$. Each MOD 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from MODs 232$a$-232$t$ may be transmitted via the antennas 234$a$-234$t$, respectively.

At the UE 120$a$, the antennas 252$a$-252$r$ may receive the downlink signals from the BS 110$a$ and may provide received signals to the demodulators (DEMODs) in transceivers 254a-254r, respectively. Each DEMOD in transceiver 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110 has a MBB manager 241 that may be configured to perform the operations illustrated in FIG. 6, as well as other operations disclosed herein for prioritizing overlapping or near overlapping UL and DL transmissions for a source BS and a target BS during a MBB handover of a UE from the source BS to the target BS, in accordance with aspects of the present disclosure described herein.

Figure 5:
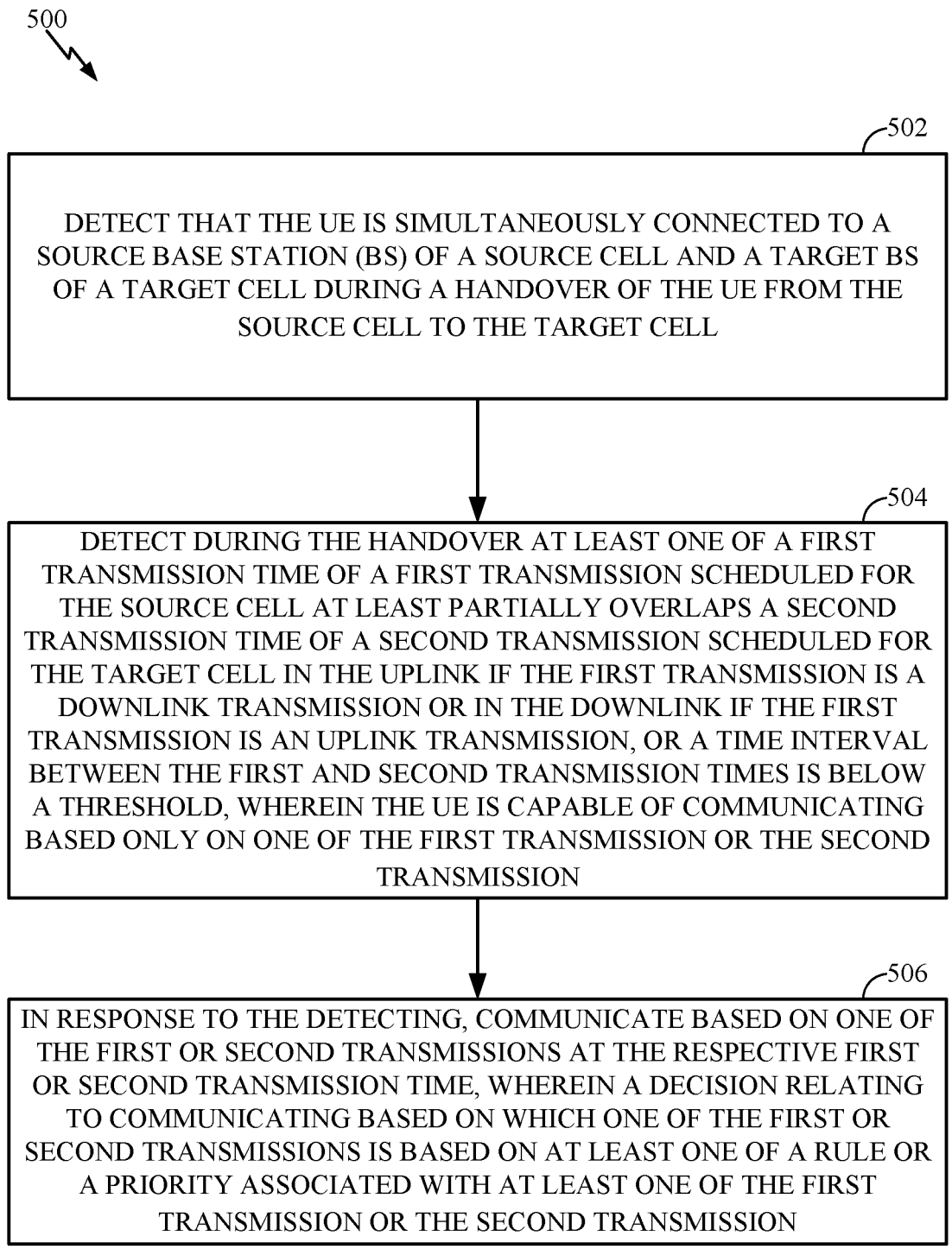
FIG. 5 illustrates example operations performed by a UE for selecting between overlapping or near overlapping uplink and downlink transmissions during a MBB handover of the UE between a source BS (e.g., source gNB) and a target BS (e.g., target gNB), in accordance with certain aspects of the present disclosure

As shown in FIG. 2, the controller/processor 280 of the UE 120 has a MBB manager 281 that may be configured to perform the operations illustrated in FIG. 5, as well as other operations disclosed herein for prioritizing overlapping or near overlapping UL and DL transmissions for a source BS and a target BS during a MBB handover of a UE from the source BS to the target BS, in accordance with aspects of the present disclosure described herein.

Although shown at the controller/processor, other components of the UE 120a and the BS 110a may be used performing the operations described herein.

In alternative aspects, the MBB manager 241 of the BS 110 may be configured for transmitting a handover command for a MBB handover of a UE from the source BS to a target BS; transmitting information relating to a new configuration to be used by the source BS and the UE during the MBB handover; receiving an indication from the UE that the new configuration has been activated by the UE; and in response to receiving the indication, activating the new configuration for use during the MBB handover, in accordance with aspects of the present disclosure described herein. Further, the MBB manager 281 of the UE 120 may be configured for receiving a handover command for a MBB handover of the UE from a source BS to a target BS; receiving information relating to a new configuration to be used by the UE and the source BS during the MBB handover; activating the new configuration for use during the MBB handover; and transmitting an indication to the source base BS that the new configuration has been activated by the UE, the indication causing the source BS to activate the new configuration synchronously with the activating by the UE, in accordance with aspects of the present disclosure described herein.

Example Make-Before-Break (MBB) Handover

One of the major goals of mobility enhancement is to achieve a 0ms interruption in service during handover of a user equipment (UE) from a source base station (BS) to a target BS. Some proposals being considered by 3rd Generation Partnership Project (3GPP) for new radio (NR) include make-before-break (MBB) type of handover which is a Rel. 14 LTE feature and includes a UE maintaining a source link to a source BS while establishing a target link to a target BS, in order to shorten or completely eliminate interruption in service to the UE. During the MBB handover from the source BS (e.g., serving a source cell) to the target BS (e.g., serving a target cell), the UE is expected to maintain connectivity with both the source BS and the target BS till the UE has successfully camped on to the target BS and can start receiving data from the target BS. In an aspect, the source and the target BSs may be distributed units (DUs)/transmission reception points (TRPs) associated with different gNBs or the same gNB. Generally, during the MBB handover the UE maintains two separate protocol stacks. Thus, the MBB handover is also referred to as dual active protocol stack (DAPs) handover.

Figure 3:
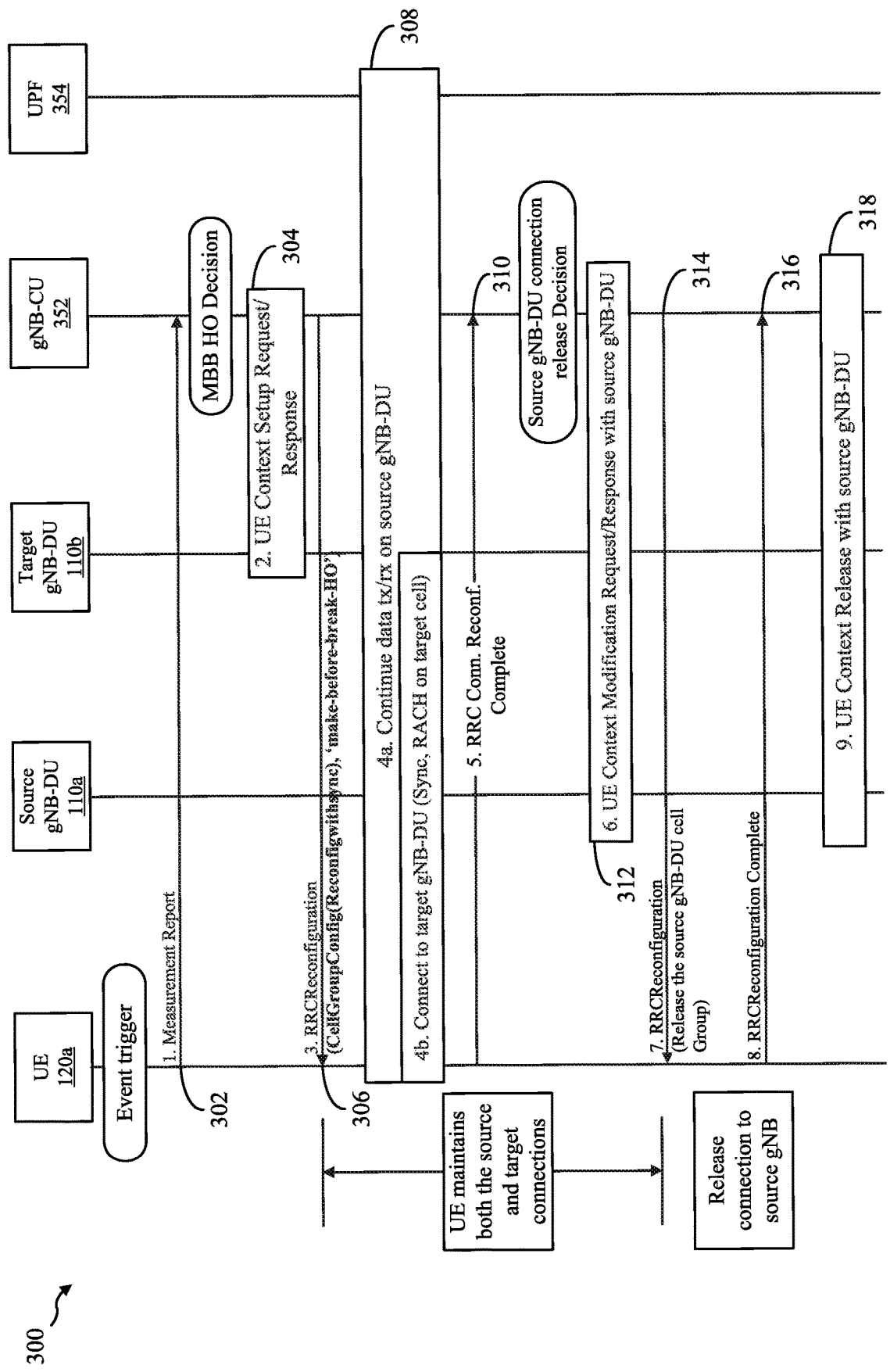
FIG. 3 illustrates an example make-before-break (MBB) handover procedure, in accordance with certain aspects of the present disclosure.

FIG. 3 is a call-flow diagram 300 illustrating an example process for a make-before-break (MBB) handover between a UE 120a and at least a source cell (e.g., such as cell 102a or cell 102b of the wireless communication network 100 of FIG. 1) corresponding to a source gNB (e.g., such as BS 110a or BS 110b of the wireless communication network 100 of FIG. 1), and a target cell (e.g., such as the cell 102a or cell 102b of the wireless communication network 100 of FIG. 1) corresponding to a target gNB (e.g., such as BS 110a or BS 110b of the wireless communication network 100 of FIG. 1). FIG. 3 also includes a gNB central unit (CU) 352 and a core network (CN) user plane function (UPF) 354.

In certain aspects, at a first step 302, an event trigger may occur at the UE 120a causing the UE 120a to communicate a measurement report with the gNB-CU 352. For example, the measurement report may indicate to the gNB-CU 352 that the UE 120a initiated an MBB handover. Accordingly, gNB-CU can make an MBB handover decision in response to receiving the measurement report. The measurement report may be triggered by a determination by the UE 120a that relative value(s) of one or more criteria (e.g., received power, received quality, path loss, etc.) associated with signaling received from the source gNB 110a are less than a threshold value.

At a second step 304, gNB-CU 352 and target gNB-DU 110b may generate a UE context setup request/response. At a third step 306, the gNB-CU 352 may transmit a radio resource control (RRC) reconfiguration message to the UE 120a. In some examples, the RRC reconfiguration message includes a "make-before-break-HO" indication requesting the UE 120a to perform MBB handover procedures. For example, the RRC Reconfiguration message may include CellGroupConfig (Reconfigwithsync) information. On receiving the RRC reconfiguration message, UE 120a maintains the connection to the source gNB-DU 110a cell even while establishing the connection to the target gNB-DU 110b cell. That is, the UE 120a can transmit and receive data via the source cell during handover.

At a fourth step 308, the UE 120a may continue data transmission and reception with the source gNB-DU 110a. The UE 120a may also connect to the target cell via synchronization and RACH procedures with the gNB-DU 110b. Upon connection with the target gNB-DU, at a fifth step 310, the UE 120a may transmit an "RRC Connection Reconfiguration Complete" message to the gNB-CU 352. Upon reception of the RRC Connection Reconfiguration Complete message, the gNB-CU may determine a release decision.

At a sixth step 312, source gNB-DU 110a, target gNB-DU 110b, and gNB-CU 352 may determine a UE Context Modification Request/Response with the source gNB-DU 110a. At a seventh step 314, the gNB-CU 352 may transmit an RRC Reconfiguration message that releases the source gNB-DU 110a cell. Upon reception of the RRC Reconfiguration message, the UE 120a may release connection to the source gNB.

At an eighth step 316, the UE 120a may transmit a RRC Reconfiguration Complete message to gNB-CU 352. At a ninth step 318, gNB-CU 352 and target gNB-DU 110b determine a UE Context Release with the source gNB-DU 110a.

Example Prioritization of Uplink Transmissions During MBB Handover

A user equipment (UE) is configured by a network entity with a time division duplex (TDD) downlink (DL)-uplink (UL) pattern for communication with one or more base stations (BSs) (e.g., gNBs). The TDD DL-UL pattern specifies which slots are to be used for DL transmissions and which slots are to be used for UL transmissions. A TDD DL-UL pattern may designate each slot as a DL slot (D), an UL slot (U) or a special slot (S). A slot designated as D is to be used for DL transmission to the UE, a slot designated as U is to be used for UL transmission by the UE, and a slot designated as a special slot S may be used for UL or DL transmissions In certain cases, during a make-before-break (MBB) handover of a UE from a source cell to a target cell, the source and the target gNBs of the respective cells may not coordinate the assignment of resources (e.g., time and frequency resources) for communication with devices (e.g., UEs) in the respective source and target cells. For example, the source and target cells may not coordinate the assignment of DL-UL patterns for communication with the UE. This lack of coordination between the source and target gNBs may lead to the source and target gNBs configuring overlapping UL and DL resources for communication with the same UE during the MBB handover. For example, both the source and target gNBs may configure a same slot or portion of a same slot for communication in opposite directions with the UE. For example, the particular slot may be configured as a DL slot by the source gNB and the same slot may be configured as an UL slot by the target gNB, or vice versa.

Most UEs generally are unable to communicate simultaneously on UL and DL direction. Thus, when the source and target cells have overlapping resources or near overlapping resources (e.g., time difference of assignments less than the minimum threshold time) scheduled for communication in opposite directions (e.g., UL for first cell and DL for second cell, and vice versa), the UE cannot simultaneously transmit in the UL direction to one cell and receive in the DL direction from the other cell.

Additionally or alternatively, different cells and corresponding gNBs may use different beams for communication with devices in their respective cells. However, generally, a UE can communicate using only one beam at a time. Thus, during a MBB handover when the UE is expected to communicate simultaneously with both the source and target cells, if the slot assignments for the source and target cells overlap, the UE cannot simultaneously communicate with both cells using their respective beams.

In certain cases, even if the resource assignments of the source and target cells may not overlap, the time difference between the resource assignments of the cells may not be long enough so that the UE can switch beams. Generally, the UE requires a minimum amount of time to switch beams. Thus, if the time interval between resource assignments of the source cell and the target cell using different beams is less than the minimum required threshold time, the UE after communicating (e.g., UL or DL) using a first resource (e.g., a first slot) of a first cell (e.g., source or target cell) may not be able to switch beams in time to communicate using a second resource (e.g., a second slot) of a second cell (the other one of the source or target cell).

Figure 4A:
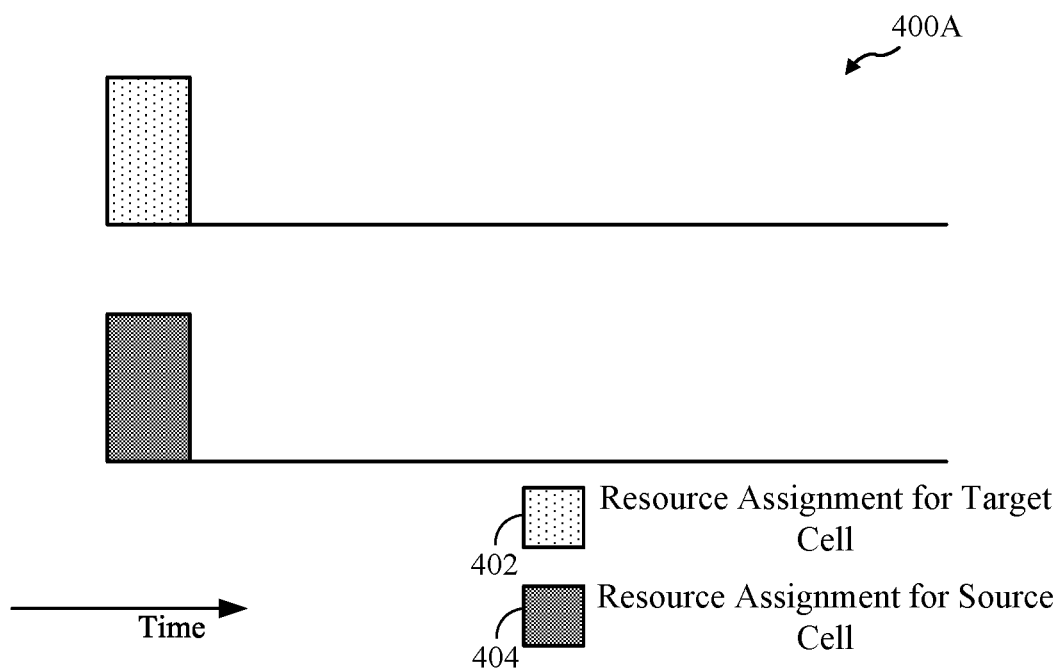
FIG. 4A illustrates an example resource assignment timeline having overlapping resource assignments for a source cell and a target cell during a MBB handover, in accordance with certain aspects of the present disclosure.

FIG. 4A illustrates an example resource assignment timeline 400A having overlapping resource assignments for a source cell and a target cell during a MBB handover.

As shown in FIG. 4A, a resource 402 is assigned for the target cell and a resource 404 is assigned for the source cell. In an aspect, each of the resources 402 and 404 may represent a slot, a portion of a slot (e.g., one or more symbols of a slot), a subframe, or a portion of a subframe, or any other time and frequency resource that may be used to represent assignment of resources for transmission within a cell. In an aspect, each of the resources 402 and 404 may be assigned for transmission on the UL or the DL, for example in accordance with an UL-DL pattern configured for a corresponding cell. For example, each of the resources 402 or 404 may be assigned for transmission of a physical downlink control channel (PDCCH), a physical downlink shared channel (PDSCH), a physical uplink control channel (PUCCH) or a physical uplink shared channel (PUSCH).

As shown in FIG. 4A, the resource 402 assigned for communication in the target cell (e.g., communication between the UE and the target cell during the MBB handover) overlaps the resource 404 assigned for communication in the source cell (e.g., communication between the UE and the source cell during the MBB handover). It may be noted that while FIG. 4A illustrates the resources 402 and 404 fully overlapping each other, in some cases, these resources 402 and 404 may partially overlap. For example, one or more symbols of the resource 402 may overlap with one or more symbols of the resource 404.

In an aspect, the source and the target cells may use different beams for communicating with the UE. As noted above, the UE is generally capable of communicating using only a single beam at a time. Thus, in the example case shown in FIG. 4A, when the UE is expected to communicate simultaneously with both the source gNB of the source cell and the target gNB of the target cell (e.g., during the MBB handover) using the overlapping resources 402 and 404, the UE can communicate with only one of the source or target gNBs using the respective assigned resource for the cell. Additionally or alternatively, when the resources 402 and 404 are scheduled for communication in opposite directions (e.g., UL and DL respectively, or vice versa), the UE may communicate in only one direction (e.g., UL or DL) using the respective resource 402 or 404. It may be noted that this limitation applies even when the resources 402 and 404 partially overlap.

Figure 4B:
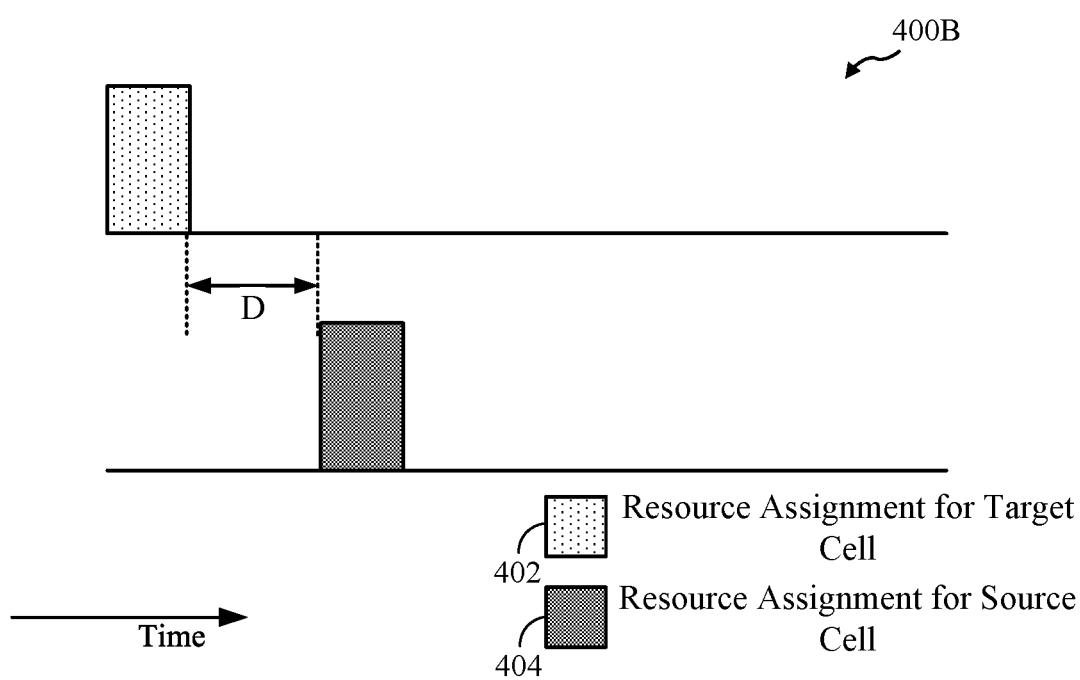
FIG. 4B illustrates an example resource assignment timeline having a time interval between resource assignments for a source cell and a target cell less than a minimum required threshold during a MBB handover, in accordance with certain aspects of the present disclosure.

FIG. 4B illustrates an example resource assignment timeline 400B having a time interval between resource assignments for a source cell and a target cell less than a minimum required threshold during a MBB handover.

As shown in FIG. 4B, the resources 402 and 404 of the target and source cells respectively do not overlap. As shown, the resources 402 and 404 are separated by a time interval D. In certain cases, the time interval D between the resources 402 and 404 may be less than a minimum required threshold time required by the UE to switch beams. For example, as a result of the time interval D being less than the required threshold, the UE, after communicating with the target gNB on a first beam using the resource 402, may not have sufficient time to switch to a second beam to communicate with the source gNB using the resource 404.

Thus, assuming that a first transmission is scheduled using the resource 402 by the target gNB and a second transmission is scheduled using the resource 404 by the source gNB during the MBB handover, and when the resources 402 and 404 assigned for the target and source cells respectively at least partially overlap in time (as shown in FIG. 4A) or when the time interval (D) between the resource assignments of the source and target cells is less than a minimum required threshold time for the UE (as shown in FIG. 4B), the UE needs to select one of first and second transmissions.

Thus, in certain aspects, when the UE is expected to communicate simultaneously with the source cell and the target cell during the MBB handover, and when an UL resource at least partially overlaps with a DL resource or when the time difference between the resources is less than a minimum required threshold, the UE needs to select one of the UL or DL transmissions.

Aspects of the present disclosure provide techniques for selecting between an UL transmission and a DL transmission scheduled by source and target cells on at least partially overlapping resources or when the time interval (D) between the resource assignments of the source and target cells is less than a minimum required threshold time, when a UE is expected to communicate simultaneously with the source and target cells during the MBB handover of the UE between the source and target cells.

FIG. 5 illustrates example operations 500 performed by a UE. For example, operations 500 may be performed by the UE (e.g., such as the UE 120a in FIG. 1 or FIG. 2) for selecting between overlapping or near overlapping UL and DL transmissions during a MBB handover of the UE between a source BS and a target BS (, in accordance with certain aspects of the present disclosure.

Operations 500 begin, at 502, by detecting that the UE is simultaneously connected to a source BS of a source cell and a target BS of a target cell during a handover of the UE from the source cell to the target cell.

At, 504, the UE detects during the handover at least one of a first transmission time of a first transmission scheduled for the source cell at least partially overlaps a second transmission time of a second transmission scheduled for the target cell in an UL if the first transmission is a DL transmission or in a DL if the first transmission is an UL transmission, or a time interval between the first and second transmission times is below a threshold, wherein the UE is capable of communicating based only on one of the first transmission or the second transmission.

At 506, the UE in response to the detecting, communicates based on one of the first or second transmissions at the respective first or second transmission time, wherein a decision relating to communicating based on which one of the first or second transmissions is based on at least one of a rule or a priority associated with at least one of the first transmission or the second transmission.

Figure 6:
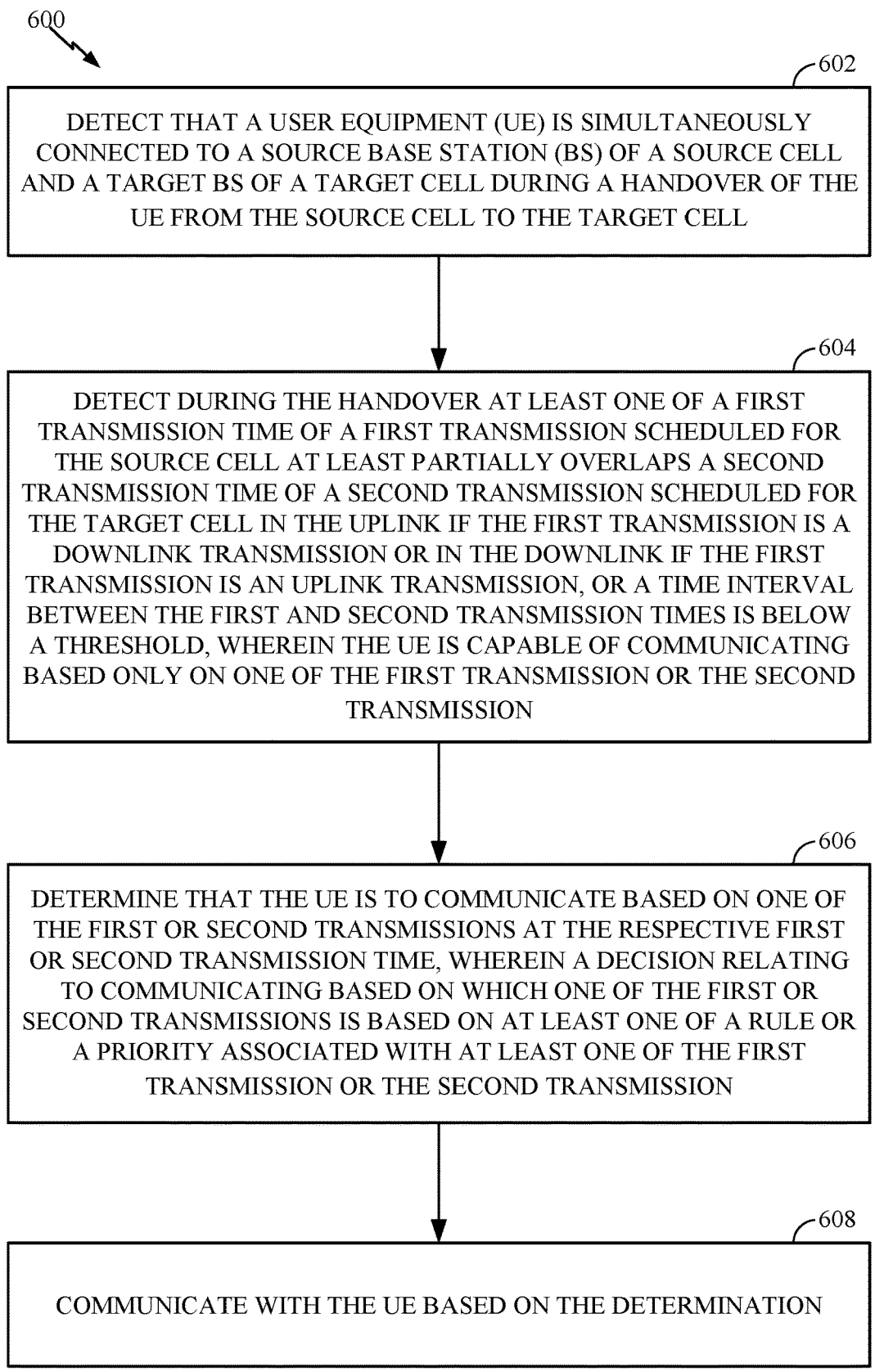
FIG. 6 illustrates example operations performed by a network entity for selecting between overlapping or near overlapping uplink and downlink transmissions during a MBB handover of a UE between a source BS and a target BS, in accordance with certain aspects of the present disclosure.

FIG. 6 illustrates example operations 600 performed by a network entity that may be considered complementary to operations 500 of FIG. 5. For example, operations 600 may be performed by a BS (e.g., such as the BS 110a of FIG. 1 or FIG. 2) for selecting between overlapping or near overlapping UL and DL transmissions during a MBB handover of a UE between a source BS and a target BS, in accordance with certain aspects of the present disclosure.

Operations 600 begin, at 602, by detecting that a UE is simultaneously connected to a source BS of a source cell and a target BS of a target cell during a handover of the UE from the source cell to the target cell.

At 604, the network entity detects during the handover at least one of a first transmission time of a first transmission scheduled for the source cell at least partially overlaps a second transmission time of a second transmission scheduled for the target cell in an UL if the first transmission is a DL transmission or in a DL if the first transmission is an UL transmission, or a time interval between the first and second transmission times is below a threshold, wherein the UE is capable of communicating based only on one of the first transmission or the second transmission.

At 606, the network entity determines that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission.

At 608, the network entity communicates with the UE based on the determination.

In an aspect, the rule indicates that the UE is not expected to transmit in the UL to a first cell earlier than a first time interval after the end of a last received DL symbol in a second cell, if the UE is not capable of full-duplex communication.

In an aspect, the rule indicates that the UE is not expected to receive in the DL from the first cell earlier than a second time interval after the end of the last transmitted UL symbol in the second cell, if the UE is not capable of full-duplex communication.

In an aspect, the first transmission is an UL transmission and the second transmission is a DL transmission. In alternative aspects, the first transmission is a DL transmission and the second transmission is an UL transmission.

In an aspect, the network entity includes at least one of the source BS, the target BS, a core network entity (e.g., gNB-CU 452) controlling both the source BS and the target BS, a core network entity (e.g., gNB-CU) controlling one of the source BS or the target BS, or a combination thereof.

In an aspect, the network entity decides that the UE is to transmit the one of the first or second transmissions at the respective first or second transmission time, based on the priority associated with at least one of the first transmission or the second transmission. The network entity transmits an indication of the decision to the UE. The UE selects between the first and second transmissions based on the indication received from the network entity.

In an aspect, the UE locally decides that the UE is to transmit which one of the first or second transmissions at the respective first or second transmission time, based on the priority associated with at least one of the first transmission or the second transmission. In an aspect, the UE transmits an indication of the decision to the network (e.g., source gNB and/or target gNB).

In an aspect, the UE may transmit one of the first or second transmissions having a higher assigned priority.

In certain aspects, a priority may be assigned to a transmission (e.g., UL or DL transmission) configured for the source cell or the target cell based on a priority associated with the cell. For example, a transmission may be assigned a higher priority if the priority associated with the corresponding cell for which the transmission is scheduled has a higher priority. For example, if the source cell has a higher associated priority, a transmission configured for the source gNB is assigned a higher priority over a transmission configured for the target gNB. In an aspect, the priority associated with each of the source cell and the target cell is determined based on at least one of a type of communication between the UE and each of the source gNB and the target gNB, or a signal strength between the UE and each of the source gNB and the target gNB.

In certain aspects, priorities may be assigned to the source and the target cells based on a current stage of the handover, a signal strength relating to communication between the UE and each of the source and target gNBs, or a combination thereof. For example, by default, the target cell may be assigned a higher priority than the source cell when a decision is made (e.g., by the NR core network entity such as CU) to handover the UE from the source cell to the target cell. This way the UE resources (e.g., RF chain and processing resources) may be assigned for communicating with the target cell as soon as the handover decision is made in order to ensure that the handover is completed efficiently and as quickly as possible. In an aspect, additionally or alternatively, the priorities may be assigned based on signal strengths relating to communication between the UE and each of the source and target gNBs. For example, a link with a higher signal strength is assigned a higher priority. In certain cases, a decision to handover the UE from the source to the target cell is generally made when the signal strength of the link between the UE and the source gNB falls below a threshold signal strength and/or the signal strength of the link between the UE and the target gNB exceeds a threshold signal strength. For example, when the signal strength of the link between the UE and the target gNB exceeds a threshold signal strength there is a higher likelihood that the UE can successfully handover to the target cell. In this case, the target cell may be assigned a higher priority and more resources may be used to communicate with the target cell. On the other hand, if the signal strength of the target gNB link falls below a threshold and the signal strength of the source gNB link is still not deteriorated too much, the source cell may be assigned a higher priority and more resources may be assigned for communicating with the source cell in order to ensure that the UE can continue to communicate with the source cell in the event that the handover to the target is unsuccessful. In an aspect, the priorities of the source and the target cells may be dynamically assigned based on the signal strengths of the links between the UE and each of the source and target gNBs. The resources assigned to each of the source and target cells may be dynamically adjusted with changing priorities of the cells.

In an aspect, the signal strength may be indicated by a value of reference signal received power (RSRP) or reference signal received quality (RSRQ) as measured by the UE. In an aspect, the UE reports to one of the source or target gNBs information relating to the signal strengths of the links between the UE and each of the source and target gNBs. The receiving gNB determines the priorities of the cells based on the received signal strengths of the links and assigns priorities of transmissions between the UE and each of the source and target gNBs based on the cell priorities.

In certain aspects, a priority may be assigned to a transmission (e.g., UL or DL transmission) configured for the source cell or the target cell based on a direction of the transmission between the UE and the source gNB or the target gNB. In other words, the priority of a transmission is assigned based on whether the transmission is an uplink transmission or a downlink transmission. In an aspect, the UE may choose to prioritize a particular transmission direction over the other. For example, the UE may assign higher priority to DL or UL. For example, the UE may prioritize the DL traffic if it does not have little or no UL traffic to transmit.

In certain aspects, a priority may be assigned to a transmission (e.g., UL or DL transmission) configured for the source cell or the target cell based on a Quality of Service (QoS) requirement of the transmission. In an aspect, each transmission (UL or DL transmission) configured between the UE and the source or target gNBs, is associated with one or more QoS metrics which include one or more of a QoS class identifier (QCI), a resource type (e.g., guaranteed bit rate (GBR), a delay critical GBR, or non-GBR), a packet delay budget (PDB), a packet error rate (PER), an averaging window, a maximum data burst volume, a reliability requirement, a priority requirement, or a latency requirement. In an aspect, a higher priority may be assigned to the transmission having more stringent QoS requirement. For example, a particular transmission configured for the source or target cells may have a more stringent latency requirement and/or higher reliability requirement as compared to another overlapping transmission of the other cell. In this case the transmission having the more stringent latency and/or reliability requirement is assigned a higher priority. For example, a transmission related to an extended reality (XR) application may have a more stringent latency requirement as compared to another overlapping transmission related to enhanced mobile broad band (EMBB). In this case, the XR transmission is assigned a higher priority.

In certain aspects, a network entity (e.g., the source gNB, the target gNB or gNB-CU) may assign priorities to the transmissions scheduled for each of the source and target cells. The network may indicate the determined priorities of the transmissions to the UE. The UE communicates with the source and target gNBs based on the priorities of the transmissions indicated by the network. For example, when the UL and DL transmissions of the source and target gNBs at least partially overlap or when the time difference between the source and target transmissions is less than the minimum required threshold time, the UE communicates based on the transmission indicated by the network as having a higher assigned priority.

In some cases, the potential problem associated with a UE being scheduled to perform an UL and DL transmission (in different cells) at the same time, or within a short interval, may be addressed via network configuration (and one or more rules). For example, a UE may not expect to be scheduled to perform an UL and DL transmission at the same time, or within such a short interval.

For example, a rule may dictate that a UE (that is not capable of full-duplex communication) may not be expected to be configured with overlapping resources for UE transmission and UE reception, or to be configured with non-overlapping resources_for UE transmission and UE reception with the time separation between the end of the first channel and the beginning of the next channel if less than [D] symbols (e.g., where the value of D may be configured by the network). As an alternative, or in addition, the UE may also not be expected to be configured with UE transmission starting less than [x] symbols from the last symbol of downlink reception where [x] is a function of the SCS of DL or to SCS of UL (and/or may also be network configured). In some cases, if the UE is scheduled in a manner that meets either of these (unexpected) conditions, the UE may treat it as an error condition, it may be up to UE implementation how to handle, and/or the UE may apply a priority to determine how to handle (as previously described).

Figure 7:
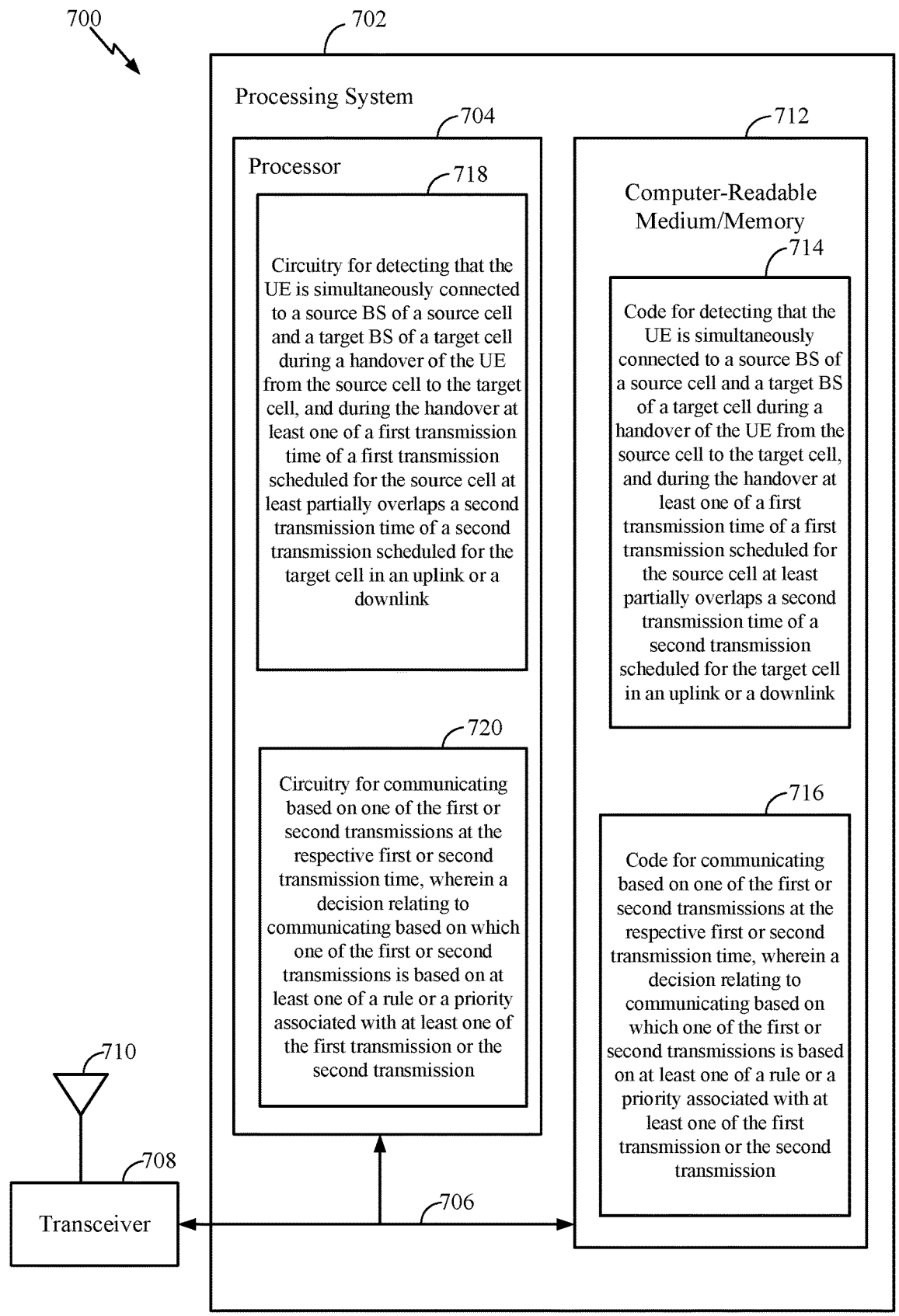
FIG. 7 illustrates a communications device that may include various components configured to perform operations for techniques disclosed herein, in accordance with certain aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 is configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., a computer-executable code) that when executed by the processor 704, cause the processor 704 to perform the operations illustrated in FIG. 5, or other operations for performing the various techniques discussed herein for prioritizing overlapping or near overlapping UL and DL transmissions for a source BS and a target BS during a MBB handover of a UE from the source BS to the target BS. In certain aspects, computer-readable medium/memory 712 stores code 714 for detecting and code 716 for communicating. The code 714 for detecting may include code for detecting that the UE is simultaneously connected to a source BS of a source cell and a target BS of a target cell during a handover of the UE from the source cell to the target cell, and during the handover at least one of a first transmission time of a first transmission scheduled for the source cell at least partially overlaps a second transmission time of a second transmission scheduled for the target cell in an UL if the first transmission is a DL transmission or in a DL if the first transmission is an UL transmission, or a time interval between the first and second transmission times is below a threshold where the UE is capable of communicating based only on one of the first transmission or the second transmission. The code 716 for communicating may include code for communicating based on one of the first or second transmissions at the respective first or second transmission time where a decision relating to communicating based on which one of the first or second transmissions is based on at least one of a rule or a priority associated with at least one of the first transmission or the second transmission.

The processor 704 may include circuitry configured to implement the code stored in the computer-readable medium/memory 712, such as for performing the operations illustrated in FIG. 5, as well as other operations for performing the various techniques discussed herein for prioritizing overlapping or near overlapping the UL and DL transmissions for the source BS and the target BS during the MBB handover of the UE from the source BS to the target BS. For example, the processor 704 includes circuitry 718 for detecting and circuitry 720 for communicating. The circuitry 718 for detecting may include circuitry for detecting that the UE is simultaneously connected to a source BS of a source cell and a target BS of a target cell during a handover of the UE from the source cell to the target cell, and during the handover at least one of a first transmission time of a first transmission scheduled for the source cell at least partially overlaps a second transmission time of a second transmission scheduled for the target cell in an UL if the first transmission is a DL transmission or in a DL if the first transmission is an UL transmission, or a time interval between the first and second transmission times is below a threshold where the UE is capable of communicating based only on one of the first transmission or the second transmission. The circuitry 720 for communicating may include circuitry for communicating based on one of the first or second transmissions at the respective first or second transmission time where a decision relating to communicating based on which one of the first or second transmissions is based on at least one of a rule or a priority associated with at least one of the first transmission or the second transmission.

Figure 8:
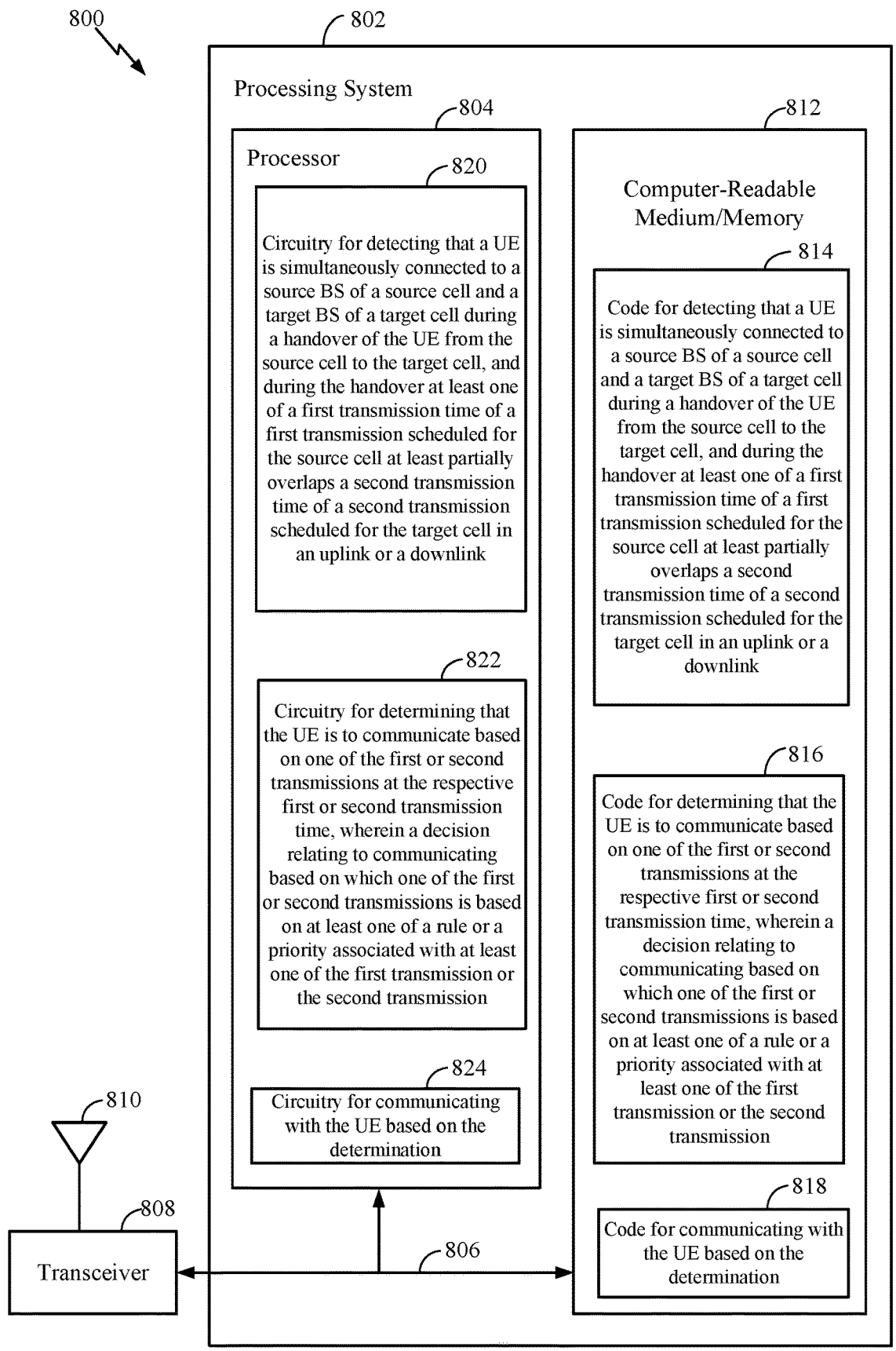
FIG. 8 illustrates a communications device that may include various components configured to perform operations for techniques disclosed herein, in accordance with certain aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 is configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., a computer-executable code) that when executed by the processor 804, cause the processor 804 to perform the operations illustrated in FIG. 6, or other operations for performing the various techniques discussed herein for prioritizing overlapping or near overlapping UL and DL transmissions for a source BS and a target BS during a MBB handover of a UE from the source BS to the target BS. In certain aspects, computer-readable medium/memory 812 stores code 814 for detecting, code 816 for determining, and code 818 for communicating. The code 814 for detecting may include code for detecting that a UE is simultaneously connected to a source BS of a source cell and a target BS of a target cell during a handover of the UE from the source cell to the target cell, and during the handover at least one of a first transmission time of a first transmission scheduled for the source cell at least partially overlaps a second transmission time of a second transmission scheduled for the target cell in an UL if the first transmission is a DL transmission or in a DL if the first transmission is an UL transmission, or a time interval between the first and second transmission times is below a threshold where the UE is capable of communicating based only on one of the first transmission or the second transmission. The code 816 for determining may include code for determining that the UE is to communicate based on one of the first or second transmissions at the respective first or second transmission time where a decision relating to communicating based on which one of the first or second transmissions is based on at least one of a rule or a priority associated with at least one of the first transmission or the second transmission. The code 818 for communicating may include code for communicating with the UE based on the determination.

The processor 804 may include circuitry configured to implement the code stored in the computer-readable medium/memory 812, such as for performing the operations illustrated in FIG. 6, as well as other operations for performing the various techniques discussed herein for prioritizing overlapping or near overlapping the UL and DL transmissions for the source BS and the target BS during the MBB handover of the UE from the source BS to the target BS. For example, the processor 804 includes circuitry 820 for detecting, circuitry 822 for determining, and circuitry 824 for communicating. The circuitry 820 for detecting may include circuitry for detecting that a UE is simultaneously connected to a source BS of a source cell and a target BS of a target cell during a handover of the UE from the source cell to the target cell, and during the handover at least one of a first transmission time of a first transmission scheduled for the source cell at least partially overlaps a second transmission time of a second transmission scheduled for the target cell in an UL if the first transmission is a DL transmission or in a DL if the first transmission is an UL transmission, or a time interval between the first and second transmission times is below a threshold where the UE is capable of communicating based only on one of the first transmission or the second transmission. The circuitry 822 for determining may include circuitry for determining that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission. The circuitry 824 for communicating may include circuitry for communicating with the UE based on the determination.

Example Embodiments

Embodiment 1: A method for wireless communication by a user equipment (UE), comprising detecting that the UE is simultaneously connected to a source base station (BS) of a source cell and a target BS of a target cell during a handover of the UE from the source cell to the target cell; detecting during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; and in response to the detecting, communicating based on one of the first or second transmissions at the respective first or second transmission time, wherein a decision relating to communicating based on which one of the first or second transmissions is based on at least one of a rule or a priority associated with at least one of the first transmission or the second transmission.

Embodiment 2: The method of Embodiment 1, wherein the rule indicates at least one of: that the UE is not expected to transmit in the uplink to a first cell earlier than a first time interval after the end of a last received downlink symbol in a second cell, if the UE is not capable of full-duplex communication; or that the UE is not expected to receive in the downlink from the first cell earlier than a second time interval after the end of the last transmitted uplink symbol in the second cell, if the UE is not capable of full-duplex communication.

Embodiment 3: The method of any of Embodiments 1-2, further comprising deciding to communicate based on the one of the first or second transmissions at the respective first or second transmission time, based on the priority associated with at least one of the first transmission or the second transmission.

Embodiment 4: The method of any of Embodiments 1-3, wherein the priority associated with the at least one of the first transmission or the second transmission is based on a priority associated with at least one of the source cell or the target cell.

Embodiment 5: The method of any of Embodiments 1-4, wherein the priority associated with the at least one of the first transmission or the second transmission is based on whether the at least one of the first transmission or the second transmission is on the UL or on the DL.

Embodiment 6: The method of any of Embodiments 1-5, wherein the priority associated with the at least one of the first transmission or the second transmission is based on a Quality of Service (QoS) associated with the at least one of the first transmission or the second transmission.

Embodiment 7: The method of any of Embodiments 1-6, further comprising receiving the priority associated with the at least one of the first transmission or the second transmission.

Embodiment 8: The method of any of Embodiments 1-7, further comprising receiving an indication of the decision relating to communicating based on which one of the first or second transmissions.

Embodiment 9: The method of any of Embodiments 1-8, wherein the handover is a make-before-break (MBB) type of handover.

Embodiment 10: The method of any of Embodiments 1-9, wherein the handover is a dual active protocol stack (DAPs) handover.

Embodiment 11: A method for wireless communication by a network entity, comprising detecting that a user equipment (UE) is simultaneously connected to a source base station (BS) of a source cell and a target BS of a target cell during a handover of the UE from the source cell to the target cell; detecting during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; determining that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission; and communicating with the UE based on the determination.

Embodiment 12: The method of Embodiment 11, wherein the rule indicates at least one of that the UE is not expected to transmit in the uplink to a first cell earlier than a first time interval after the end of a last received downlink symbol in a second cell, if the UE is not capable of full-duplex communication; or that the UE is not expected to receive in the downlink from the first cell earlier than a second time interval after the end of the last transmitted uplink symbol in the second cell, if the UE is not capable of full-duplex communication.

Embodiment 13: The method of any of Embodiments 11-12, further comprising deciding that the UE is to communicate based on the one of the first or second transmissions at the respective first or second transmission time, based on the priority associated with at least one of the first transmission or the second transmission; and transmitting an indication of the decision to the UE.

Embodiment 14: The method of any of Embodiments 11-13, wherein the priority associated with the at least one of the first transmission or the second transmission is based on a priority associated with at least one of the source cell or the target cell.

Embodiment 15: The method of any of Embodiments 11-14, wherein the priority associated with the at least one of the first transmission or the second transmission is based on whether the at least one of the first transmission or the second transmission is on the UL or on the DL.

Embodiment 16: The method of any of Embodiments 11-15, wherein the priority associated with the at least one of the first transmission or the second transmission is based on a Quality of Service (QoS) associated with the at least one of the first transmission or the second transmission.

Embodiment 17: The method of any of Embodiments 11-16, further comprising transmitting, to the UE, the priority associated with the at least one of the first transmission or the second transmission.

Embodiment 18: The method of any of Embodiments 11-17, wherein the handover is a make-before-break (MBB) type of handover.

Embodiment 19: The method of any of Embodiments 11-18, wherein the network entity comprises at least one of the source BS, the target BS, a core network entity controlling both the source BS and the target BS, a core network entity controlling at least one of the source BS or the target BS, or a combination thereof.

Embodiment 20: The method of any of Embodiments 11-19, wherein the handover is a dual active protocol stack (DAPs) handover.

Embodiment 21: An apparatus for wireless communication by a user equipment (UE), comprising: at least one processor and a memory configured to detect that the UE is simultaneously connected to a source base station (BS) of a source cell and a target BS of a target cell during a handover of the UE from the source cell to the target cell; detect during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; and in response to the detection, communicate based on one of the first or second transmissions at the respective first or second transmission time, wherein a decision relating to communicating based on which one of the first or second transmissions is based on at least one of a rule or a priority associated with at least one of the first transmission or the second transmission.

Embodiment 22: The apparatus of Embodiment 21, wherein the rule indicates at least one of that the UE is not expected to transmit in the uplink to a first cell earlier than a first time interval after the end of a last received downlink symbol in a second cell, if the UE is not capable of full-duplex communication; or that the UE is not expected to receive in the downlink from the first cell earlier than a second time interval after the end of the last transmitted uplink symbol in the second cell, if the UE is not capable of full-duplex communication.

Embodiment 23: The apparatus of any of Embodiments 21-22, wherein the at least one processor and the memory are further configured to decide to communicate based on the one of the first or second transmissions at the respective first or second transmission time, based on the priority associated with at least one of the first transmission or the second transmission.

Embodiment 24: The apparatus of any of Embodiments 21-23, wherein the priority associated with the at least one of the first transmission or the second transmission is based on a priority associated with at least one of the source cell or the target cell.

Embodiment 25: The apparatus of any of Embodiments 21-24, wherein the priority associated with the at least one of the first transmission or the second transmission is based on whether the at least one of the first transmission or the second transmission is on the UL or on the DL.

Embodiment 26: The apparatus of any of Embodiments 21-25, wherein the priority associated with the at least one of the first transmission or the second transmission is based on a Quality of Service (QoS) associated with the at least one of the first transmission or the second transmission.

Embodiment 27: The apparatus of any of Embodiments 21-26, wherein the at least one processor and the memory are further configured to receive the priority associated with the at least one of the first transmission or the second transmission.

Embodiment 28: The apparatus of any of Embodiments 21-27, wherein the at least one processor and the memory are further configured to receive an indication of the decision relating to communicating based on which one of the first or second transmissions.

Embodiment 29: The apparatus of any of Embodiments 21-28, wherein the handover is a make-before-break (MBB) type of handover.

Embodiment 30: The apparatus of any of Embodiments 21-29, wherein the handover is a dual active protocol stack (DAPs) handover.

Embodiment 31: An apparatus for wireless communication by a network entity, comprising: at least one processor and a memory configured to: detect that a user equipment (UE) is simultaneously connected to a source base station (BS) of a source cell and a target BS of a target cell during a handover of the UE from the source cell to the target cell; detect during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; determine that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission; and communicate with the UE based on the determination.

Embodiment 32: The apparatus of Embodiment 31, wherein the rule indicates at least one of: that the UE is not expected to transmit in the uplink to a first cell earlier than a first time interval after the end of a last received downlink symbol in a second cell, if the UE is not capable of full-duplex communication; or that the UE is not expected to receive in the downlink from the first cell earlier than a second time interval after the end of the last transmitted uplink symbol in the second cell, if the UE is not capable of full-duplex communication.

Embodiment 33: The apparatus of any of Embodiments 31-32, wherein the at least one processor and the memory are further configured to decide that the UE is to communicate based on the one of the first or second transmissions at the respective first or second transmission time, based on the priority associated with at least one of the first transmission or the second transmission; and transmit an indication of the decision to the UE.

Embodiment 34: The apparatus of any of Embodiments 31-33, wherein the priority associated with the at least one of the first transmission or the second transmission is based on a priority associated with at least one of the source cell or the target cell.

Embodiment 35: The apparatus of any of Embodiments 31-34, wherein the priority associated with the at least one of the first transmission or the second transmission is based on whether the at least one of the first transmission or the second transmission is on the UL or on the DL.

Embodiment 36: The apparatus of any of Embodiments 31-35, wherein the priority associated with the at least one of the first transmission or the second transmission is based on a Quality of Service (QoS) associated with the at least one of the first transmission or the second transmission.

Embodiment 37: The apparatus of any of Embodiments 31-36, wherein the at least one processor and the memory are further configured to transmit, to the UE, the priority associated with the at least one of the first transmission or the second transmission.

Embodiment 38: The apparatus of any of Embodiments 31-37, wherein the handover is a make-before-break (MBB) type of handover.

Embodiment 39: The apparatus of any of Embodiments 31-38, wherein the network entity comprises at least one of the source BS, the target BS, a core network entity controlling both the source BS and the target BS, a core network entity controlling at least one of the source BS or the target BS, or a combination thereof.

Embodiment 40: The apparatus of any of Embodiments 31-39, wherein the handover is a dual active protocol stack (DAPs) handover.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
    detecting that the UE is simultaneously connected to a source base station (BS) of a source cell and a target BS of a target cell during a handover of the UE from the source cell to the target cell;
    detecting during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; and
    in response to the detecting, communicating based on one of the first or second transmissions at the respective first or second transmission time, wherein a decision relating to communicating based on which one of the first or second transmissions is based on at least one of a rule or a priority associated with at least one of the first transmission or the second transmission.

2. The method of claim 1, wherein the rule indicates at least one of:
    that the UE is not expected to transmit in the uplink to a first cell earlier than a first time interval after the end of a last received downlink symbol in a second cell, if the UE is not capable of full-duplex communication; or
    that the UE is not expected to receive in the downlink from the first cell earlier than a second time interval after the end of the last transmitted uplink symbol in the second cell, if the UE is not capable of full-duplex communication.

3. The method of claim 1, further comprising:
    deciding to communicate based on the one of the first or second transmissions at the respective first or second transmission time, based on the priority associated with at least one of the first transmission or the second transmission.

4. The method of claim 1, wherein the priority associated with the at least one of the first transmission or the second transmission is based on a priority associated with at least one of the source cell or the target cell.

5. The method of claim 1, wherein the priority associated with the at least one of the first transmission or the second transmission is based on whether the at least one of the first transmission or the second transmission is on the UL or on the DL.

6. The method of claim 1, wherein the priority associated with the at least one of the first transmission or the second transmission is based on a Quality of Service (QoS) associated with the at least one of the first transmission or the second transmission.

7. The method of claim 1, further comprising:
    receiving the priority associated with the at least one of the first transmission or the second transmission.

8. The method of claim 1, further comprising:
    receiving an indication of the decision relating to communicating based on which one of the first or second transmissions.

9. The method of claim 1, wherein the handover is a make-before-break (MBB) type of handover.

10. The method of claim 1, wherein the handover is a dual active protocol stack (DAPs) handover.

11. A method for wireless communication by a network entity, comprising:
    detecting that a user equipment (UE) is simultaneously connected to a source base station (BS) of a source cell and a target BS of a target cell during a handover of the UE from the source cell to the target cell;
    detecting during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission;
    determining that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission; and
    communicating with the UE based on the determination.

12. The method of claim 11, wherein the rule indicates at least one of:
    that the UE is not expected to transmit in the uplink to a first cell earlier than a first time interval after the end of a last received downlink symbol in a second cell, if the UE is not capable of full-duplex communication; or
    that the UE is not expected to receive in the downlink from the first cell earlier than a second time interval after the end of the last transmitted uplink symbol in the second cell, if the UE is not capable of full-duplex communication.

13. The method of claim 11, further comprising:
    deciding that the UE is to communicate based on the one of the first or second transmissions at the respective first or second transmission time, based on the priority associated with at least one of the first transmission or the second transmission; and transmitting an indication of the decision to the UE.

14. The method of claim 11, wherein the priority associated with the at least one of the first transmission or the second transmission is based on a priority associated with at least one of the source cell or the target cell.

15. The method of claim 11, wherein the priority associated with the at least one of the first transmission or the second transmission is based on whether the at least one of the first transmission or the second transmission is on the UL or on the DL.

16. The method of claim 11, wherein the priority associated with the at least one of the first transmission or the second transmission is based on a Quality of Service (QoS) associated with the at least one of the first transmission or the second transmission.

17. The method of claim 11, further comprising:
transmitting, to the UE, the priority associated with the at least one of the first transmission or the second transmission.

18. The method of claim 11, wherein the handover is a make-before-break (MBB) type of handover.

19. The method of claim 11, wherein the network entity comprises at least one of the source BS, the target BS, a core network entity controlling both the source BS and the target BS, a core network entity controlling at least one of the source BS or the target BS, or a combination thereof.

20. The method of claim 11, wherein the handover is a dual active protocol stack (DAPs) handover.

21. An apparatus for wireless communication by a user equipment (UE), comprising:
at least one processor and a memory configured to:
detect that the UE is simultaneously connected to a source base station (BS) of a source cell and a target BS of a target cell during a handover of the UE from the source cell to the target cell;
detect during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission; and
in response to the detection, communicate based on one of the first or second transmissions at the respective first or second transmission time, wherein a decision relating to communicating based on which one of the first or second transmissions is based on at least one of a rule or a priority associated with at least one of the first transmission or the second transmission.

22. The apparatus of claim 21, wherein the rule indicates at least one of:
that the UE is not expected to transmit in the uplink to a first cell earlier than a first time interval after the end of a last received downlink symbol in a second cell, if the UE is not capable of full-duplex communication; or
that the UE is not expected to receive in the downlink from the first cell earlier than a second time interval after the end of the last transmitted uplink symbol in the second cell, if the UE is not capable of full-duplex communication.

23. The apparatus of claim 21, wherein the at least one processor and the memory are further configured to:
decide to communicate based on the one of the first or second transmissions at the respective first or second transmission time, based on the priority associated with at least one of the first transmission or the second transmission.

24. The apparatus of claim 21, wherein the priority associated with the at least one of the first transmission or the second transmission is based on a priority associated with at least one of the source cell or the target cell.

25. The apparatus of claim 21, wherein the priority associated with the at least one of the first transmission or the second transmission is based on whether the at least one of the first transmission or the second transmission is on the UL or on the DL.

26. The apparatus of claim 21, wherein the priority associated with the at least one of the first transmission or the second transmission is based on a Quality of Service (QoS) associated with the at least one of the first transmission or the second transmission.

27. The apparatus of claim 21, wherein the at least one processor and the memory are further configured to:
receive the priority associated with the at least one of the first transmission or the second transmission.

28. The apparatus of claim 21, wherein the at least one processor and the memory are further configured to:
receive an indication of the decision relating to communicating based on which one of the first or second transmissions.

29. The apparatus of claim 21, wherein the handover is a make-before-break (MBB) type of handover.

30. The apparatus of claim 21, wherein the handover is a dual active protocol stack (DAPs) handover.

31. An apparatus for wireless communication by a network entity, comprising:
at least one processor and a memory configured to:
detect that a user equipment (UE) is simultaneously connected to a source base station (BS) of a source cell and a target BS of a target cell during a handover of the UE from the source cell to the target cell;
detect during the handover at least one of a first transmission time of a first transmission scheduled for the source cell at least partially overlaps a second transmission time of a second transmission scheduled for the target cell in an uplink if the first transmission is a downlink transmission or in a downlink if the first transmission is an uplink transmission, or a time interval between the first and second transmission times is below a threshold, wherein the UE is capable of communicating based only on one of the first transmission or the second transmission;
determine that the UE is to communicate based on one of the first or second transmissions at the respective first or second transmission time, wherein a decision relating to communicating based on which one of the first or second transmissions is based on at least one of a rule or a priority associated with at least one of the first transmission or the second transmission; and
communicate with the UE based on the determination.

32. The apparatus of claim 31, wherein the rule indicates at least one of:

that the UE is not expected to transmit in the uplink to a first cell earlier than a first time interval after the end of a last received downlink symbol in a second cell, if the UE is not capable of full-duplex communication; or that the UE is not expected to receive in the downlink from the first cell earlier than a second time interval after the end of the last transmitted uplink symbol in the second cell, if the UE is not capable of full-duplex communication.

33. The apparatus of claim 31, wherein the at least one processor and the memory are further configured to:

decide that the UE is to communicate based on the one of the first or second transmissions at the respective first or second transmission time, based on the priority associated with at least one of the first transmission or the second transmission; and transmit an indication of the decision to the UE.

34. The apparatus of claim 31, wherein the priority associated with the at least one of the first transmission or the second transmission is based on a priority associated with at least one of the source cell or the target cell.

35. The apparatus of claim 31, wherein the priority associated with the at least one of the first transmission or the second transmission is based on whether the at least one of the first transmission or the second transmission is on the UL or on the DL.

36. The apparatus of claim 31, wherein the priority associated with the at least one of the first transmission or the second transmission is based on a Quality of Service (QoS) associated with the at least one of the first transmission or the second transmission.

37. The apparatus of claim 31, wherein the at least one processor and the memory are further configured to:

transmit, to the UE, the priority associated with the at least one of the first transmission or the second transmission.

38. The apparatus of claim 31, wherein the handover is a make-before-break (MBB) type of handover.

39. The apparatus of claim 31, wherein the network entity comprises at least one of the source BS, the target BS, a core network entity controlling both the source BS and the target BS, a core network entity controlling at least one of the source BS or the target BS, or a combination thereof.

40. The apparatus of claim 31, wherein the handover is a dual active protocol stack (DAPs) handover.

\* \* \* \* \*